(12) United States Patent
Weiss et al.

(10) Patent No.: US 8,069,406 B2
(45) Date of Patent: Nov. 29, 2011

(54) METHOD AND SYSTEM FOR IMPROVING USER EXPERIENCE WHILE BROWSING

(75) Inventors: Yoav Weiss, Saint-Donat sur Pharbasse (FR); Yair Shapira, Haifa (IL); Petro Flomin, Ariel (IL)

(73) Assignee: Flash Networks, Inc., Herzlia (IL)

( * ) Notice: Subject to any disclaimer, the term of this patent is extended or adjusted under 35 U.S.C. 154(b) by 1143 days.

(21) Appl. No.: 11/814,907

(22) PCT Filed: Feb. 8, 2006

(86) PCT No.: PCT/IL2006/000163
§ 371 (c)(1),
(2), (4) Date: Jul. 26, 2007

(87) PCT Pub. No.: WO2006/085314
PCT Pub. Date: Aug. 17, 2006

(65) Prior Publication Data
US 2008/0222242 A1    Sep. 11, 2008

Related U.S. Application Data

(60) Provisional application No. 60/652,322, filed on Feb. 11, 2005.

(51) Int. Cl.
*G06F 17/00* (2006.01)

(52) U.S. Cl. .................. 715/208; 715/205; 715/234

(58) Field of Classification Search .......... 715/200, 715/205, 208, 234, 236
See application file for complete search history.

(56) References Cited

U.S. PATENT DOCUMENTS

| | | | |
|---|---|---|---|
| 5,946,697 A | 8/1999 | Shen | |
| 6,249,844 B1 | 6/2001 | Schloss et al. | |
| 6,308,043 B1 * | 10/2001 | Solheim et al. | 455/63.1 |
| 6,640,284 B1 | 10/2003 | Shaw et al. | |
| 6,654,766 B1 | 11/2003 | Degenaro et al. | |
| 6,721,780 B1 * | 4/2004 | Kasriel et al. | 709/203 |
| 6,795,060 B2 * | 9/2004 | Rekimoto et al. | 345/173 |
| 2002/0087221 A1 * | 7/2002 | Keeler et al. | 700/48 |
| 2002/0113778 A1 * | 8/2002 | Rekimoto et al. | 345/173 |
| 2002/0147912 A1 | 10/2002 | Shmueli et al. | |

(Continued)

FOREIGN PATENT DOCUMENTS

WO    WO 01/20485 A2    3/2001

(Continued)

*Primary Examiner* — Stephen Hong
*Assistant Examiner* — Gregory J Vaughn
(74) *Attorney, Agent, or Firm* — Smith Risley Tempel Santos, LLC; Gregory Scott Smith (57) ABSTRACT

The rendering of markup language based files is accelerated by employing an apparatus to capture requests for markup language pages. The requested pages are retrieved and then examined to identify additional links that are contained therein. The markup language page is then modified by adding a trigger or tag into the page. The trigger or tag is basically a mechanism to automate a request for additional markup language information or pages. The trigger or tag, when received by the device requesting the markup language page, will invoke a request to obtain the markup language information or file represented by the tag. The tag can be a browser activated link or a JavaScript. A predictive module is used to review the additional links in the requested pages to identify a predicted next page to be downloaded or requested. This predicted next page or link can be a most likely candidate for what a user viewing the current page would request.

20 Claims, 3 Drawing Sheets

U.S. PATENT DOCUMENTS

| | | |
|---|---|---|
| 2003/0188021 A1 | 10/2003 | Challenger et al. |
| 2003/0231185 A1* | 12/2003 | Kupersmit .................... 345/589 |
| 2003/0237053 A1 | 12/2003 | Chen et al. |
| 2004/0024632 A1* | 2/2004 | Perry .............................. 705/10 |
| 2006/0095558 A1* | 5/2006 | Christian ..................... 709/224 |
| 2007/0198716 A1 | 8/2007 | Knowles et al. |

FOREIGN PATENT DOCUMENTS

| | | |
|---|---|---|
| WO | WO2006127750 A1 | 11/2006 |
| WO | WO2006127876 A2 | 11/2006 |
| WO | WO2007008291 A1 | 1/2007 |

* cited by examiner

METHOD AND SYSTEM FOR IMPROVING USER EXPERIENCE WHILE BROWSING

CROSS-REFERENCE TO RELATED APPLICATIONS

This application is filed under 37 U.S.C. 371 and is based on International Patent Number PCT/IL2006/000163 entitled "METHOD AND SYSTEM FOR IMPROVING USER EXPERIENCE WHILE BROWSING" which was filed on Feb. 8, 2006, which application claims the benefit of the filing date and priority of United States Provisional Application for Patent having been assigned the Ser. No. of 60/652,322 and filed on Feb. 11, 2005 naming Yoav Weiss, Yair Shapira and Petro Flomin as the inventors, which application is herein incorporated by reference.

BACKGROUND

The present invention relates to the field of portal browsing, and more particularly to improving the quality of the user experience while navigating various websites by using the time that the user is viewing one page, to predict and fetch a following or next web page or additional browsing pages.

A very popular method for propagating data communication between computers all over the world is through the Internet. The Internet is a hierarchy of many computer networks, all of which are interconnected by various types of server computers. Some of the servers may include websites that are comprised of databases with a plurality of web pages. The web pages may be retrieved by various users or devices using a variety of techniques, such as web browsers, FTP based applications, etc. A term in the art for users employing the use of a web browser is "surfers" who surf the Internet by accessing various web pages. Many current web pages are defined by markup languages (ML) files. A markup language file is a set of commands that define the manner in which the graphics and text for a website are displayed or rendered on a display device. Common markup languages include, but are not limited to, HTML, XML, WML, HDML, etc. HTML is an acronym for Hyper Text Markup Language, XML is an acronym for Extensible Markup Language, WML is an acronym for Wireless Markup Language and HDML is an acronym for Handheld Device Markup Language. It should be noted that the terms "HTML", "XML" and "WML" may be used interchangeably herein. Henceforth, the description of different embodiments of the present invention may use the term 'HTML' as a representative term for any markup language or hybrid thereof.

A markup language file defines the graphical layout and the look of the web page. A common HTML file may comprise information that is relevant to the web page, information such, as but not limited to, a style sheet, text, images, tags, Java Scripts, links to a style sheet, links to Java Scripts, links to additional objects, links to other web pages, etc.

Typically, although not always, an HTML or WML file includes only basic text and links to style sheets, Java scripts, images, and other objects rather than containing the actual style sheet or the various objects. Within the markup language file, there are typically two types of links that can be found: (1) browser activated or rendering links and (2) user or surfer activated links. The browser activated links or tags are automatically invoked or traversed by the browser application while the page is being read and parsed. For example, links or tags to Java scripts, a style sheet, and images can be browser links. The markup language file may also contain user activated links. These user activated links are displayed on a rendered web page and can be selected by the surfer. These links can include links to other pages, graphic displays, help boxes, etc, and are also referred to as surfer links and hyper links.

While surfing the World Wide Web (WWW) a surfer (client), who uses a computer equipped with a browser application, may send an HTTP (Hyper Text Transfer Protocol) request to a web server. In response, the web server may send an HTML file that defines the requested web page. In the disclosure of the different embodiments of the present invention the term computer represents any type of data communication device including but not limited to a laptop computer, a PDA, a cellular unit, a notebook computer, a personal computer, etc.

When a user or system accesses a website or a web page, the delivery of an HTML file is initiated. Upon receiving the HTML file or page, the browser or other application begins parsing the HTML file. It is not immediately displayed to the user because it must first be converted into the appropriate display format—this is referred to as rendering. As the browser or application parses the HTML file, portions of the web page can be displayed while the remainder of the HTML file is examined. When a browser link is found in the HTML file, the browser may operate to stop or suspend the parsing of the HTML file, establish a new connection according to the browser link, wait to get the object or data associated with the browser link, parse the object and/or data, render any display information associated with the browser link, and finally, resume parsing of the HTML file. In parallel the page may be available to the user while the objects are being downloaded, and the objects are filled in or rendered onto the displayed web page as they arrive. Usually, while navigating an HTML page, a user may select a user activated link or hyper link for a next page or object. Once this occurs, the same process of receiving the HTML file, parsing, etc. commences. All rendering, parsing or displaying activity for the current page is ceased, and the HTML file for the new page or object is received and the process starts all over from the beginning. As a result, for slower connections and highly complex and intricate web pages, the user can experience significant delays in receiving rendered and displayed web pages. Therefore, surfing or browsing can be quite frustrating especially for a users of slow speed connections, such as users of a cellular network.

Thus, it is evident that current technologies of browsing are still insufficient and there is a need in the art for new optimizing methods that will accelerate fetching of web pages and improving the user experience.

Furthermore, because of the huge number of users that surf the Internet, there is a need for any new methods that accelerate fetching of web pages to operate without necessitating the modification of the user's equipment. A method having a clientless solution is recommended. Such a method may operate within the standard to be independent on the user's equipment/software.

BRIEF SUMMARY OF THE DESCRIPTION

Aspects, features and embodiments of the present invention provide a method and system for accelerating the downloading process of web pages by operating to pre-fetch web pages or objects and pushing those objects to a user's equipment prior to be requested by the user.

An exemplary embodiment of the present invention may be installed in a manipulation equipment server (MEQ) at a content server site, such as a Web portal or a WAP portal, for example. Such an embodiment maintains information regarding which web pages/objects are most likely to be requested by users, and pre-downloads those web pages and/or objects to associated web clients in advance of actual requests being made by the user. An exemplary embodiment may comprise a user module and a predictive module. The user module may intercept the upload and download traffic between a plurality of users and the portal (web site). Furthermore, the embodiment may parse user requests, such as but not limited to, the HTTP file, and update the predictive module about user requests. In addition, the user module may parse responses to the user requests, such as but not limited to, the received or accessed HTML files or any other type of markup language (ML) file, in whole or in part, that have been received in response to the user request. The ML file may be parsed and links to other objects may be transferred to the predictive module for additional processing.

In a common surfing session a browser application has to initiate a connection and requests a web-page or an object in order to get them. A common content server cannot initiate pushing of objects toward a surfer without receiving a request. Therefore, in order to facilitate pre-pushing of predicted objects toward a surfer, the browser has to be triggered to request an object or the objects. In order to trigger the browser to request an object an embodiment of the present invention manipulates a previously requested ML file to include one or more additional browser links. The additional browser links can point to an object, a JavaScript or an image, for example that can initiate a request to a predicted object/ML file.

In one exemplary embodiment, which is referred in this application as the static push method, the additional browser link can point on the location of the predicted web-page itself. In alternate embodiment of the present invention, the additional browser links can point to an arbitrary URL (Uniform resource location), that may cause or prompt the MEQ to respond by sending a predicated object. The predicted object can be sent as a multipart object. Such an embodiment is referred as a dynamic push method.

Yet in an alternate exemplary embodiment of the present invention, a JavaScript push scheme can be employed. This exemplary embodiment is particularly applicable for use when a browser supports an external JavaScript. In such an embodiment, an ML file is manipulated and a non cacheable external JavaScript is added to the ML file. The external JavaScript can add a ML code to the ML file causing a receiving browser to fetch additional objects (either each object separately, or several objects bundled in a multipart object).

In order to lead the browser to cache these pre-push predicted objects and not displaying them before being requested by the surfer, embodiments of the present invention may further manipulate the ML file. The further manipulation can associate the predicted object with a small transparent image in the current page. Associating with a transparent image can be done in one embodiment by using style directives for not displaying the object that is associated with the additional link. Or attentively an allocated display space that is associated with the additional browser links can be small to be seen. Later, when the additional objects are required by the user, then the browser operates to fetch these objects from the cache, instead of requesting them over the network or wireless link, and thus, speeding up the user's browsing experience. The predictive module may accumulate statistical information pertaining to various portal pages (web pages). The statistical information may be user specific statistics, or may be general information. Based on the statistical information, the predictive module may identify various information about a link or object. For example, the predictive module may calculate a link rank based at least in part on a previous hit rate for that particular link. When accessing web pages, the objects associated with the best-ranked links are pre-fetched and be pushed to the user. Pushing the pre-fetched objects to the user can be in response to receiving a request to get the image that is associated with the image tag that was added to the previous HTML file, for example.

In one exemplary embodiment of the present invention statistical information may be accumulated according to the "link name" and not the URL to address the fact that the same link may be represented by several different URLs. A "link name" can be defined by various parameters such as, but not limited to, the user experience base, meaning: the title of the parent HTML, text inside the link, text of the image inside the link, etc. The "link name" may represent the way the user perceives the link.

An exemplary embodiment of the present invention may handle one or more than one markup languages and/or one or more than one connections simultaneously.

Embodiments of the present invention reduce the amount of new connections that a browser at the client must open when it parses a markup language file, such as but not limited to an HTML file, and improves the user's experience.

Other objects, features, and advantages of the present invention will become apparent upon reading the following detailed description of the embodiments with the accompanying drawings and appended claims.

DETAILED DESCRIPTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
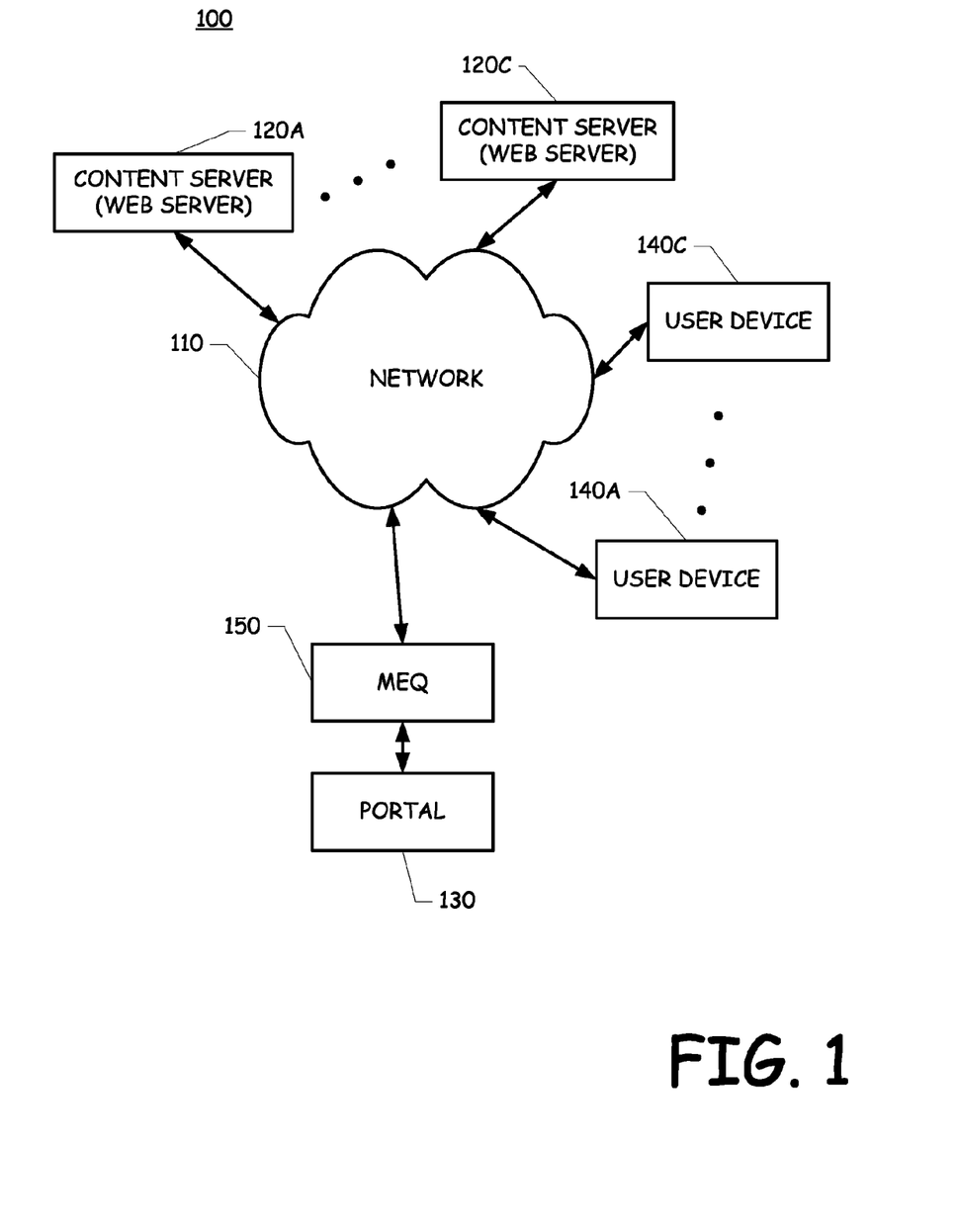
FIG. 1 illustrates a block diagram of an exemplary communication system that implements an exemplary embodiment of the present invention.

FIG. 1 illustrates a block diagram of an exemplary communication system 100 suitable for implementing an exemplary embodiment of the present invention. System 100 may comprises a network 110; a plurality of content servers (such as but not limited to web servers) 120*a-c*; a plurality of user devices 140*a-c*; a portal 130 and a manipulation equipment server MEq 150. It will be appreciated by those skilled in the art that depending upon its configuration and the needs, system 100 may comprise more than three content servers 120*a-c*, and user devices 140*a-c*. However, for purposes of simplicity of understanding, three units of each are shown.

Network 110 is based on the Internet Protocol (IP). It may represent one or more networks segments, including but not limited to, one or more Internet segments, one or more Intranets, etc. Network 110 may run over one or more type of physical networks. It may run over a combination of PSTN, ISDN, Cellular, etc.

Network 110 may include intermediate nodes along the connection between a user device and a web server. The intermediate node may include, but is not limited to, IP service provider servers, cellular service provider servers and other types of service provider equipment.

A plurality of user devices 140*a-c* may be connected over the network 110 to access web content servers 120*a-c* via portal 130. A common user device 140*a-c* may run a browser software program to surf the network and to communicate with one or more content servers 120*a-c* via portal 130. User devices 140 may be a laptop computer, a PDA such as a handheld computer, a cellular phone, a palm computer, an Internet appliance or other device having the communications, processing and display capabilities for performing the present invention. User devices 140*a-c* may use a commonly or commercially available browsing software application or even a proprietary browsing application. In either case, there is no need to modify the user devices 140*a-c* to communicate with the MEq 150.

The MEq 150 may intercept the communication between the portal 130 and the Internet and "see" all the traffic between the user devices 140*a-c* and the content web servers 120*a-c* or portal 130. In one embodiment of the present invention, the MEq 150 operates to accelerate the browsing process and improves the experience of a user surfing via the portal 130. In an alternate embodiment of the present invention (not shown in the drawings), the MEq 150 may be connected between the user devices 140*a-c* and the rest of the network, or between the network and the relevant content servers. Yet in another embodiment of the present invention (not shown in the drawings) the user devices 140*a-c* are not connected to the web servers "through" the portal, but perhaps being redirected to them by the portal (so once they are connected to the web servers, the portal does not "see" this traffic). The presence and the operation of the MEq 150 is transparent to the user devices 140*a-c*. More information on the operation of the MEq 150 is disclosed below in conjunction with the description of FIGS. 2 and 3.

Figure 2:
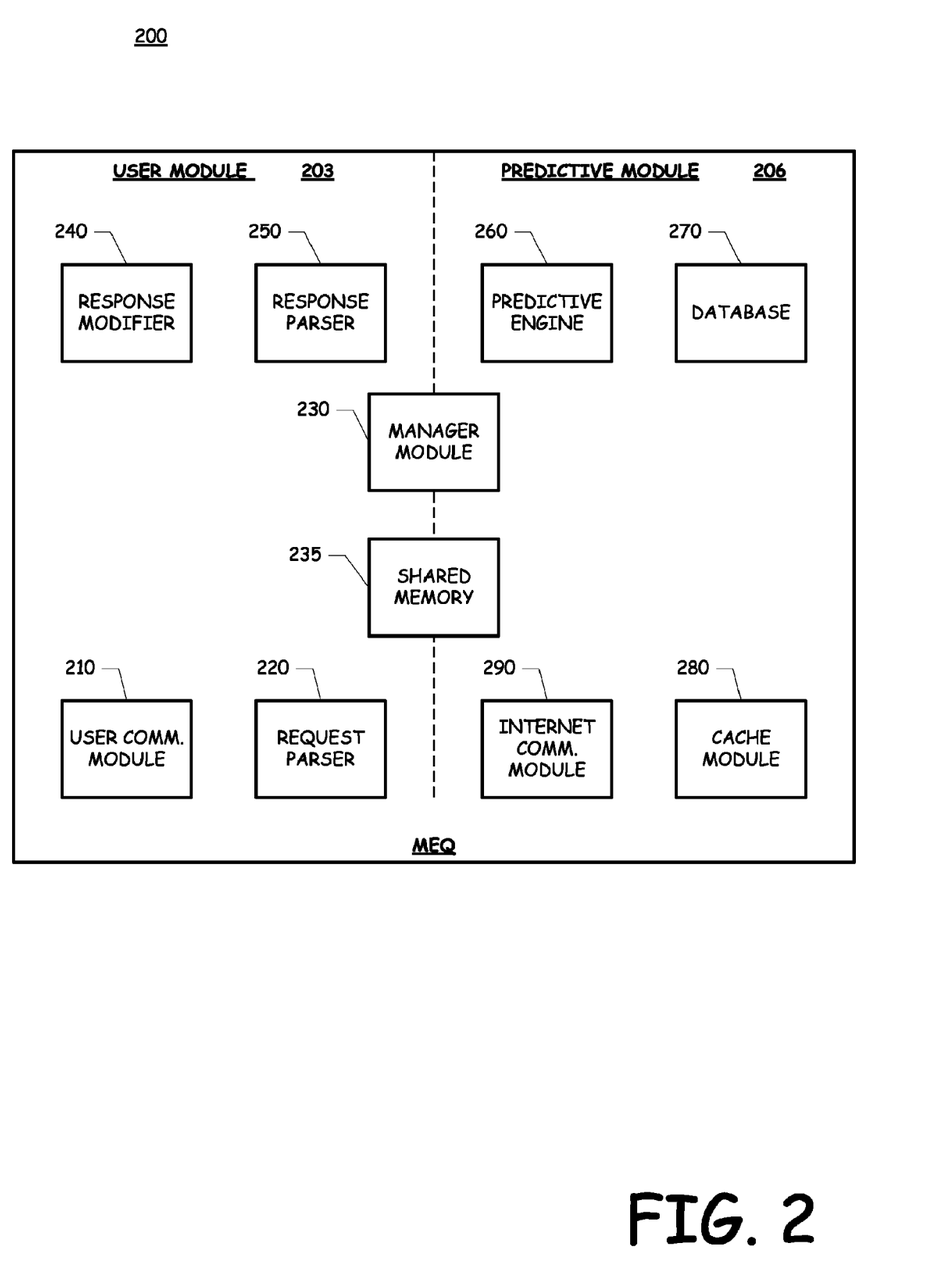
FIG. 2 illustrates a block diagram of relevant software modules of an exemplary embodiment of the present invention.

FIG. 2 is a block diagram of an exemplary MEq server 200 that could be incorporated into the MEq server 150 as illustrated in FIG. 1. The MEq 200 may be associated with a portal 130 (FIG. 1). Henceforth, the description of embodiments of the present invention may use the term 'server' as a representative term for a content server or a proxy server or any other type of server that may be surfed by a user device 140*a-c*. The MEq 200 operates to accelerate the presentation of web pages that are transferred via the portal 130 to the user devices 140*a-c*. In one exemplary embodiment of the present invention, the MEq 200 may be a software module that is installed in the portal 130. The portal 130 may be configured to transfer the transportation via the MEq 200 before transmitting it to the user device. In an alternate exemplary embodiment of the present invention, the MEq 200 may be installed in a separate server that is located in an intermediate node over the connection between the content server and the user device and receives the transportation between the portal 130 and the user devices. A site may comprise one or more MEq 200 servers that work in parallel.

An exemplary MEq 200 may comprise, among others modules, two main modules: a user module 203 and a predictive module 206. The user module 203 may comprise a user communication module 210, a request parser 220, a manager module 230, a response modifier 240 and a response parser 250. The predictive module 206 may comprise, among others modules, an Internet communication interface 290, a cache 280, a predictive engine 260 and a database 270. A shared memory 235 may be used as a common interface between the different modules of the MEq 200. The shared memory may be used as a temporary storage in which one or more modules may store information to be used by another one or more of the modules. Each module may have a queue in the shared memory 235 in which a pointer may be placed to point the location in the shared memory in which the stored information is located. Other exemplary embodiments may use other types of communication between the different modules of the MEq 200. For example, a packet switched bus may be used.

User communication module 210 may be configured to receive requests and transmit responses to the plurality of user devices 140*a-c* (FIG. 1) and to maintain the connection with the relevant user devices 140*a-c*. A received request from user device 140*a-c* is transferred to the request parser 220 and an indication may be sent to the manager module 230. The request may be stored in the shared memory 235 and a pointer may be stored in a queue that is associated with request parser 220. The request parser 220, according to its queue and at the appropriate time, may parse the request and may deliver information to manager module 230. The information may include information on the connections, such as but not limited to the source IP address and source IP ports, and additional information on the type of the request, such as whether the request is for a new page or is it for an object that belongs to a previous page. If the request is for an object, the information may indicate if the object is an image object that a tag for requesting it had been added to a previous markup language file (HTML file, for example) in order to initiate a pre-fetch pushing process.

Manager module 230 may manage a centralized table in which each connection with a user device 140*a-c* may have one or more entries. Each entry may include address information, type of request, information on tags for pre-fetch image object, etc. In the discloser of exemplary embodiments of the present invention, the pre-fetch image object can be referred as pushImg. Manager module 230 may inform the predictive engine 260 about the type of the request. The predictive engine 260 may use this information to update the database 270 and to recalculate a link "rank" value for the appropriate link. If the type of the request is for a pre-fetch image object, it indicates that a previous page, in which a trigger to this image object was added, has been selected by the user. This information may increase the link rank of the previous page.

If the request type is for a regular object or for a new page, then manager module 230 may check whether cache 280 includes an object or page that fits the request. If the object or page is in the cache 280, the content is retrieved from the cache 280 and transferred to response parser 250. If the object or the page is not stored in the cache 280, then manager module 230 may instruct the communication module 290 to fetch the object or page via portal 130 (FIG. 1) from the appropriate web server. Upon receiving a response via the portal 130, the response may be stored at the cache 280 and/or be transferred to the response parser 250 and the manager module 230 may be informed.

If the request type is for a pre-fetch image object (pushImg), of which its tag was added to a previous page, then the manager module 230 may identify a predicted HTML file that is associated with the relevant tag and checks the cache 280 to determine if the predicted HTML file is available. If the HTML file is available in the cache, the predicted HTML file is retrieved and transferred to the response parser 250. If the HTML file is not ready, a small transparent image may be sent in its place. Alternatively if the HTML file is not available at the cache, the predicted HTML file can be fetched from its original location.

The response parser 250 may parse a response. The response can be a predicted one, a cached one or a received one. If the response is not a markup language file, the manger module 230 is updated and the response is transferred to the user communication module 210 and from there to the appropriate user device 140a-c (FIG. 1).

If the response is a markup language (ML) file, such as but not limited to HTML or WML, etc., the ML file is parsed to retrieve links to other pages or objects. The links are transferred to the manager module 230 and to the predictive engine 260. In parallel, the ML file is transferred to the response modifier 240.

The response modifier 240 may operate to modify an ML file to include additional browser links in order to facilitate "pre-pushing" of predictive web-pages. The browser link can be associated with a small transparent image in the current manipulated web-page. For example, an exemplary response modifier 240 may add a pushImg tag at the end of the ML file. Furthermore, the response modifier 240 may create a multipart object. The multipart object may comprise a pre-fetched object that is associated with a pushImg tag that has been added to a previous manipulated web-page. Then, the manager module 230 is updated and the multipart object is transferred to the user communication module 210 to be sent via portal 130 to the appropriate user device. In an embodiment in which a multipart object is not used, additional tags may be added, one per each predicted object.

Yet in an alternate exemplary embodiment of the present invention in which a JavaScript push scheme is used, the response modifier 240 may modify the ML file and add a dynamic, non cacheable external JavaScript. The external JavaScript can add an ML code to the ML file causing the browser to fetch objects (either each object separately, or several objects bundled in a multipart object).

Upon receiving the links from the response parser 250, the predictive engine 260 may calculate the probability for the next link that may be selected by the user, who is associated with the relevant ML file. The calculation may be based on statistical information that has been accumulated in the database 270. In one exemplary embodiment of the present invention, the statistical information may be sorted according to the "link name". In an alternate embodiment of the present invention, the links may be sorted according to the appropriate URL. The calculation may define a link rank. The link rank can be based on a variety of parameters and may be user dependent or not, ML file dependent or not, etc. Different methods may be used to define a link rank. For example, in one embodiment, a link rank may be proportional to the number of users that have selected the link. Furthermore, the link rank may depend on the time with old selections having different value weight compared to recent selections, etc. Links that were recently accessed by the user are not likely to be accessed again by the same user, so that decreases their probability. In addition, various users can be viewed as a group of users, and then rankings can be based on group statistics (on top of general and user specific statistics). A "link name" may be defined by various parameters but are typically based on user experience, including but not limited to, the title of the parent HTML, text inside the link, alternate text of the image inside the link, etc. A link having the highest rank can be selected as a predicted link.

The predicted link is transferred to the manager module 230. The manager module 230 may instruct the cache module 280 to fetch the ML file associated with the predicted link. In parallel, the predicted link is assigned to the appropriate pushImg tag in the centralized table. In one exemplary embodiment of the present invention the cache module 280 may be configured to fetch and store the associated ML file. In an alternate embodiment, of the present invention the cache module 280 may be configured to fetch the predicted link associated ML file, to parse it and to fetch objects that are associated with browser links that are included in the ML file. More information on the operation of MEq 200 is disclosed below in conjunction with the description of FIG. 3.

Figure 3:
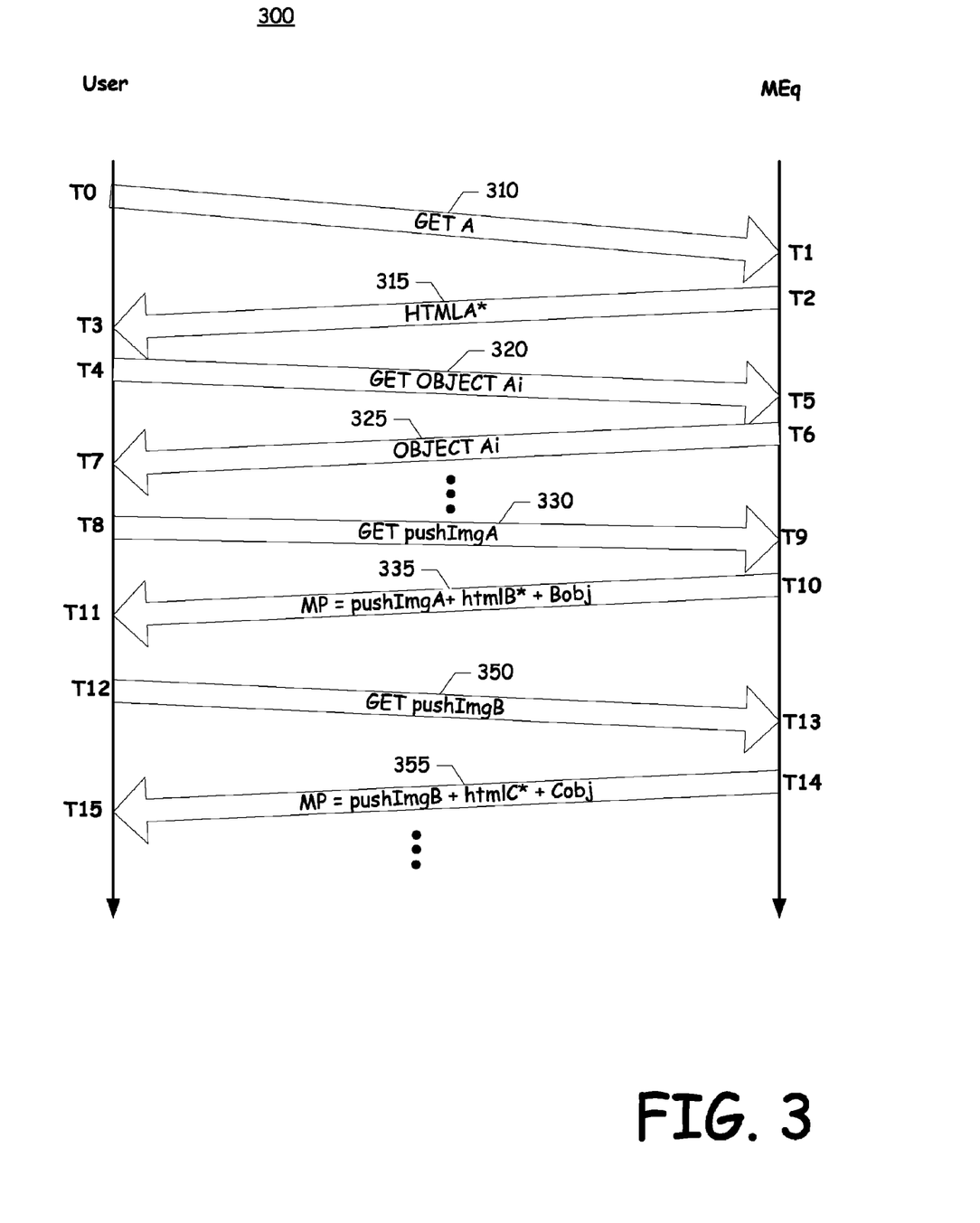
FIG. 3 illustrates a time diagram with relevant steps in an exemplary process of surfing while using an exemplary embodiment of the present invention.

FIG. 3 illustrates a timing diagram 300 that represents steps involved in a surfing process in which an exemplary embodiment of the present invention is used. At T0 a request 310 to get a web page 'A' (GET A) is sent from a user device 140a-c (FIG. 1) to portal 130 (FIG. 1). At T1 the request is intercepted by exemplary MEq 150. The request is processed by the MEq 150 as it is disclosed above and if a response to the request is not in the cache 280 (FIG. 2), the request is transferred toward its destination (not shown). In between T1 and T2, a response for the request 310 is retrieved from the cache or is intercepted by the exemplary MEq 150 (not shown) and parsed by response parser 250 (FIG. 2) and at T2 a modified response 315 (modified ML file) with a trigger or tag for a pre-fetch image object (pushImg) is sent (HTML A*) to the user device 140. In an exemplary embodiment of the present invention in which a JavaScript push scheme is used as a trigger, the modified response 315 includes a dynamic, non-cacheable external JavaScript that is added to the ML file 315 (HTML A*). The external JavaScript can add an ML code to the ML file causing a receiving browser to fetch additional objects (either each object separately, or several objects bundled in a multipart object).

At T3 the HTML A* 315 is received by the user device. A browser (a common one, for example) may process the modified response HTML A* file. As result of this processing, in the period between T4 to T8 a series of pairs 320 and 325 are transferred between the user device and the MEq server. A pair 320 and 325 may include a common object request 320 that is associated with the HTML A* (GET object Ai) and an appropriate responses 325 object (Object Ai).

At T8 the entire page, which is associated with the request to get web page 'A', is parsed and presented to the user, in parallel transparently to the user, the browser parses the tag (or the JavaScript push scheme, in an alternate exemplary embodiment of the present invention) and a request for a pre-fetch image object that is associated with page 'A' (pushImgA) is sent 330 (GET pushImgA). In parallel (not shown in the drawing) to the communication with the user device, during the period that started at T2, the MEq may process the HTML A as it is disclosed above. A predicted link may be selected and a web page 'B' that is associated with the predicted link may be fetched and stored at the cache.

At T9 the 'GET pushImgA' request 330 is intercepted by the MEq, processed by request parser 220 (FIG. 2) as it is disclosed above and at T10 a response 335 may be sent toward the user device. The response may be a multipart object. The multipart object (MP) may comprise a transparent small image (as a response to the appropriate pushImgA tag) and a predictive ML file (HTML B*) with the pushImgB tag for the next page. In an alternate embodiment of the present invention the multipart object may include also objects that are associated with browser links that are embedded in HTML B (Bobj). The MP 335 reaches the user equipment on T11, while the user may be involved in handling web page 'A'. Therefore, the MP 335 is stored in the browser's cache.

In between T11 to T12, the user may select the link to web page 'B'. In response to this selection, the browser may check its cache for an appropriate file. If the web page 'B' is stored in the browser cache, the web page B may immediately be parsed and be presented to the user. In one exemplary embodiment of the present invention, the 'B' may be presented with the 'B' object. In an alternate embodiment, the browser may request the 'B' objects. At T12 the browser reaches the tag (or the JavaScript push scheme, in an alternate exemplary embodiment of the present invention) for pushImgB and sends a request 350 GET pushImgB. At T13 the request is intercepted by the MEq 150 (FIG. 1) and the process proceeds as it is described above from T9 to T11 for the next predicted file 'C' 355. The process may continue as long as the user is surfing.

Overall, this invention will improve the experience of a surfer during browsing the network by reducing the time to present a web page and reducing the amount of connections that a browser operating on a user device may set during surfing a content server.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

It will be appreciated that the above described methods may be varied in many ways, including, changing the order of steps, and the exact implementation used. It should also be appreciated that the above described description of methods and apparatus are to be interpreted as including an apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for accelerating the presentation of a file based at least in part on a markup language, the method comprising the steps of:
    a. intercepting, at a manipulation equipment (MEq) server, a request for a first markup language (ML) file sent from a requester device, the requester device having a browser application, to a web server;
    b. fetching, by the MEq server from the web server, the requested first ML file;
    c. selecting a predicted link for a predicted second file;
    d. parsing and modifying, at the MEq server, the fetched requested first ML file by adding a tag for fetching a multipart object; and
    e. sending the modified fetched requested first ML file to the requester device;
    wherein the multipart object bundles a transparent object with the predicted second file.

2. The method of claim 1, wherein the step of selecting the predicted link further comprises the steps of fetching, by the MEq server, the predicted second file.

3. The method of claim 2, further comprising:
    f. responding to a request caused by the modification to the first ML file by sending the fetched predicted second file bundled in the multipart object with the transparent image.

4. The method of claim 1, wherein the transparent object is a transparent image.

5. The method of claim 4, wherein the tag is related to a scripting language code that causes the browser to fetch the multipart object.

6. The method of claim 4, wherein the tag is a link to the location of the multipart object.

7. The method of claim 4, wherein the tag is a link to an arbitrary URL of an object for enabling sending any predicted second file within the multipart object.

8. The method of claim 1, wherein the first file includes a plurality of browser links and hyper links, and the step of selecting a predicted link further comprises the steps of:
    ranking one or more of the hyper links in the first file; and
    selecting the predicted link by selecting the hyper link with the highest ranking.

9. The method of claim 8, wherein the step of ranking the one or more hyper links further comprises ranking the one or more hyper links based on a previous hit rate for the one or more hyper links.

10. A method for accelerating the presentation of markup language based files over a network, the method comprising the steps of:
    receiving, at a manipulation equipment (MEq) server, a request from a requesting device to retrieve a first markup language based file from a web server, the first markup language based file including a plurality of browser links and hyper links and the requesting device including a rendering application;
    retrieving, at the MEq server, from the web server, the requested first markup language based file;
    parsing and modifying, at the MEq server, the first markup language based file by inserting a trigger to invoke a multipart object that bundles further markup language based information;
    providing the modified first markup language based file to the requesting device;
    retrieving at the MEq server, from the web server, the further markup language based information;
    in response to the rendering application of the requesting device rendering the trigger, receiving a request for the multipart object; and
    providing multipart object that bundles the further markup language information to the requesting device.

11. The method of claim 10, wherein the step of modifying the first markup language based file by inserting a trigger further comprises inserting a browser activated link.

12. The method of claim 10, wherein the further markup language information comprises another web page.

13. The method of claim 10, wherein the step of modifying the first markup language based file by inserting a trigger further comprises inserting a scripting language code that causes the browser to fetch the multipart object.

14. A manipulation equipment (MEq) server that accelerates the presentation of markup language based files sent from one or more content servers over a data network to a user device, the MEq server is communicatively coupled to the data network and comprising:

a user module; and a predictive module comprising:

i. a cache memory;

ii. a predictive engine; and iii. a data network communication module that interfaces to data network;

the user module comprising:

i. a user communication module that communicates with the user device and receives a user's request;

ii. a request parser that parses the request and determines if the request is for a first markup language based file;

iii. a manager module that obtains the requested first markup language based file by either accessing the cache memory to determine if the first markup language based file is presented and if not to request the data network communication module to fetch the first markup language based file;

iiii. a response parser that receives a response to the manager module request and parses the first markup language file;

iiiii. a response modifier that modifies the first markup language file by adding a trigger to a multipart object that bundles a first transparent image with a first pre-fetch object; and     the user communication module being further operable to transfer the modified first markup language file to the user device.

15. The MEq server of claim 14, wherein the response parser further extracts links from the first markup language file, and the predictive engine operable to receive one or more links from the response parser and defines at least one predicted link, from the one or more received links, and the manager module being further operable to receive the at least one predicted link to retrieve a second markup language based file associated with the at least one predicted link and to modified the retrieved second markup language based file to include a trigger to a second multipart object that bundles a second transparent image and a second pre-fetch object.

16. The MEq server of claim 15, wherein the predictive engine determines a predicted link by examining statistical data pertaining to the one or more links received from the response parser.

17. The MEq server of claim 15, further comprising:

the user communication module further receives a request that is associated with the trigger to the first multipart object; and     the manager module in response to the request, which is associated with the trigger to the first multipart object, causing the transfer of the multipart object to the user device, the multipart object including the first transparent image and the first pre-fetched object.

18. The MEq server of claim 14, wherein the trigger to trigger to the multipart object is a browser activated link that invokes the sending of the multipart object.

19. The MEq server of claim 14, wherein the trigger is a scripting language code, which when executed causes the fetching of the multipart object.

20. The MEq server of claim 14, wherein the cache is used to store additional markup language file content for expedited retrieval.

\* \* \* \* \*